United States Patent
Bäker et al.

(10) Patent No.: US 6,496,108 B1
(45) Date of Patent: Dec. 17, 2002

(54) METHOD AND DEVICE FOR REGULATING CLEARANCE FOR A VEHICLE

(75) Inventors: Wolfgang Bäker, Braunschweig (DE); Thomas Ruchatz, Lehre (DE)

(73) Assignee: Volkswagen AG, Wolfburg/Fallerslersleben (DE)

( * ) Notice: Subject to any disclaimer, the term of this patent is extended or adjusted under 35 U.S.C. 154(b) by 0 days.

(21) Appl. No.: 09/524,458

(22) Filed: Mar. 10, 2000

(30) Foreign Application Priority Data

Mar. 10, 1999 (DE) .......................... 199 10 590

(51) Int. Cl.⁷ ................................ B60Q 1/00
(52) U.S. Cl. ................ 340/436; 340/903; 340/935; 701/301
(58) Field of Search ................ 340/903, 935, 340/436, 435; 701/301

(56) References Cited

U.S. PATENT DOCUMENTS

| | | | | |
|---|---|---|---|---|
| 5,189,619 A | * | 2/1993 | Adachi et al. | 364/416.04 |
| 5,278,764 A | * | 1/1994 | Iizuka et al. | 364/461 |
| 5,357,438 A | * | 10/1994 | Davidian | 364/461 |
| 5,420,792 A | * | 5/1995 | Butsuen et al. | 364/426.04 |
| 5,684,473 A | * | 11/1997 | Hibino et al. | 340/903 |
| 6,014,601 A | * | 1/2000 | Gustafson | 701/45 |
| 6,067,031 A | * | 5/2000 | Janky et al. | 340/903 |
| 6,094,616 A | * | 7/2000 | Andreas et al. | 701/96 |

FOREIGN PATENT DOCUMENTS

| | | |
|---|---|---|
| DE | 42 00 694 | 7/1993 |
| DE | 42 09 047 | 8/1993 |
| DE | 691 00 568 | 3/1994 |
| DE | 691 23 947 | 4/1997 |
| DE | 198 11 585 | 10/1998 |
| EP | 0 813 986 | 2/1997 |
| JP | 00700478 63 | 2/1995 |
| JP | 0070262498 | 10/1995 |
| WO | WO 93/24 894 | 12/1993 |

OTHER PUBLICATIONS

P. Protzel et al., "Abstandsregelung von Fahrzeugenmit Fuzzy Control" [Regulating The Spacing Of Vehicles Using Fuzzy Control], Symposium volume of minutes of the Third Dortmudner Fuzzy Days Symposium, Reihe Informatik Aktuel, Springer Publishers 1993.

* cited by examiner

Primary Examiner—Daniel J. Wu
Assistant Examiner—Phung T Nguyen
(74) Attorney, Agent, or Firm—Kenyon & Kenyon

(57) ABSTRACT

The present invention relates to a method for regulating clearance for a vehicle, in which a relative velocity ($v_{rel}$) and a relative distance (a) between the vehicle and a second vehicle driving ahead are detected, and a control signal for an adaptive cruise control device is generated from these quantities. The control signal being derived from a danger criterion (G) is determined from the relative velocity ($v_{rel}$) and the relative distance (a), this danger criterion which is weighted with an adaptive factor (AF) representing the individual driving behavior of a vehicle driver, and a control signal initiating a deceleration of the vehicle is generated when the danger criterion (GF), weighted with the adaptive factor and adapted to the vehicle driver, falls below a defined threshold value (S).

11 Claims, 2 Drawing Sheets

METHOD AND DEVICE FOR REGULATING CLEARANCE FOR A VEHICLE

FIELD OF THE INVENTION

The present invention relates to a method for regulating clearance for a vehicle, in which a relative speed and a relative distance between the vehicle and a second vehicle driving ahead of it are detected, and a control signal for an adaptive cruise control device of the vehicle is generated from these quantities; and also relates to a device for implementing the method.

BACKGROUND OF THE INVENTION

German laid open application 42 00 694 A1 describes a method for regulating speed and distance of a vehicle with respect to an object located ahead of it in the direction of to travel. In that known method, the prevailing distance, as well as the instantaneous speed of the vehicle, are detected, and setpoint values for the distance to the object located in front of the vehicle and for the driving speed are calculated and set. A problem with this method, and with other known methods that enable a vehicle to be driven while regulating clearance, is that adaptive cruise controls are conceived as driver-supporting systems whose acceptance by the driver depends on how similar the control response is to his/her own driving behavior, especially in maintaining the distance to a vehicle driving ahead.

The publication "Abstandsregelung von Fahrzeugen mit Fuzzy-Control" ["Regulating the Spacing of Vehicles Using Fuzzy Control"], symposium volume of minutes of the Third Dortmunder Fuzzy Days Symposium, Reihe Informatik Aktuell [Current Series on Information Studies], Springer Publishers 1993 suggests determining a distance model which is a function of the type of driver and the weather instead of a definite specified setpoint distance. According to this proposal, the type of driver would be determined by an external sensory mechanism; however, a method for reliably recognizing the type of driver automatically is not described in the aforementioned publication.

Applicant's earlier patent application EP 0 813 986 A2 discloses a method for regulating clearance for a vehicle, in which the setpoint distance to a second vehicle driving ahead is determined. This method employs a device for calculating the setpoint distance as a function of at least the driving speed of the vehicle. The response characteristics of the device may be adapted to the individual driving behavior of a vehicle driver, in the sense that the individual time interval between the vehicle and the second vehicle ahead is maintained by determining the setpoint distance. The device includes a fuzzy controller that receives driving speed as input variable and at least one additional input variable, and a setpoint distance is generated as the output variable. In addition, control equipment is provided in which truth values for the setpoint distance are determined from truth values for the input variables, and an output matching function is provided with which the setpoint distance to be reset is determined from the truth values of the setpoint distance. To carry out this control, a number of classes are established over the range of values of the input variables, and value combinations of the input variables and the distance values occurring in a learning phase are recorded. The established classes are modified, discarded, and/or new classes are generated as a function of the recorded value combinations, and adapted control equipment rules are generated as a function of the matching functions adapted to the established classes.

It may be that such a method allows the adaptive cruise control to be acceptably adjusted to a vehicle driver and, therefore, increases the acceptance of such a method.

However, it has the disadvantage that the fuzzy logic to be used in this case is relatively complex and, therefore, the device is expensive and costly to manufacture.

OBJECTS AND SUMMARY OF THE INVENTION

It is an object of the present invention to provide a method and a device for regulating distance of a vehicle and a second vehicle ahead of it, in such a way that, given a simple design, the control response of the method according to the present invention can be adjusted to the driving behavior of an individual vehicle driver.

It is another object of the invention to provide a method and device, adapted to an individual vehicle driver, for regulating the distance between a vehicle and a second vehicle ahead of it which are characterized by their acceptance-promoting control response and ability to be easily implemented. Advantageously, the device for carrying out the method according to the present invention is relatively simple and low cost. In addition, complicated, and thus, time- and device-intensive learning processes are no longer necessary so that the method of the present invention is especially applicable to regulating clearance during cutting-in maneuvers, in which an overtaking vehicle passes the vehicle equipped with the adaptive cruise control method of the present invention and enters back into the lane in front of it.

The foregoing objectives are achieved according to the present invention by determining a danger criterion based on the relative speed and the relative distance between two moving vehicles, by weighting this danger criterion with an adaptive factor representing the individual driving behavior of the vehicle driver, and by generating a control signal causing the vehicle to decelerate when the danger criterion, which is weighted with the adaptive factor and adjusted to the vehicle driver, exceeds a defined threshold value.

The present invention provides a method for regulating clearance for a vehicle, in which a relative velocity ($v_{rel}$) and a relative distance (a) between the vehicle and a vehicle driving ahead is detected, and a control signal (RV) for an adaptive cruise control device of the vehicle is generated from these quantities, wherein a danger criterion (G) is determined from the relative velocity ($v_{rel}$) and the relative distance (a); that this danger criterion (G) is weighted with an adaptive factor (AF) representing the individual driving behavior of the driver of the vehicle; and that a control signal (RV) initiating deceleration of the vehicle is generated when the danger criterion (GF) weighted with the adaptive factor (AF) and adjusted to the vehicle driver, falls below a defined threshold value (S).

The present invention also provides a device for regulating clearance that operates in accordance with the above-described method.

Further details and advantages of the present invention can be taken from the exemplary embodiment, which is described below with reference to the Figures.

DETAILED DESCRIPTION OF THE INVENTION

Figure 1:
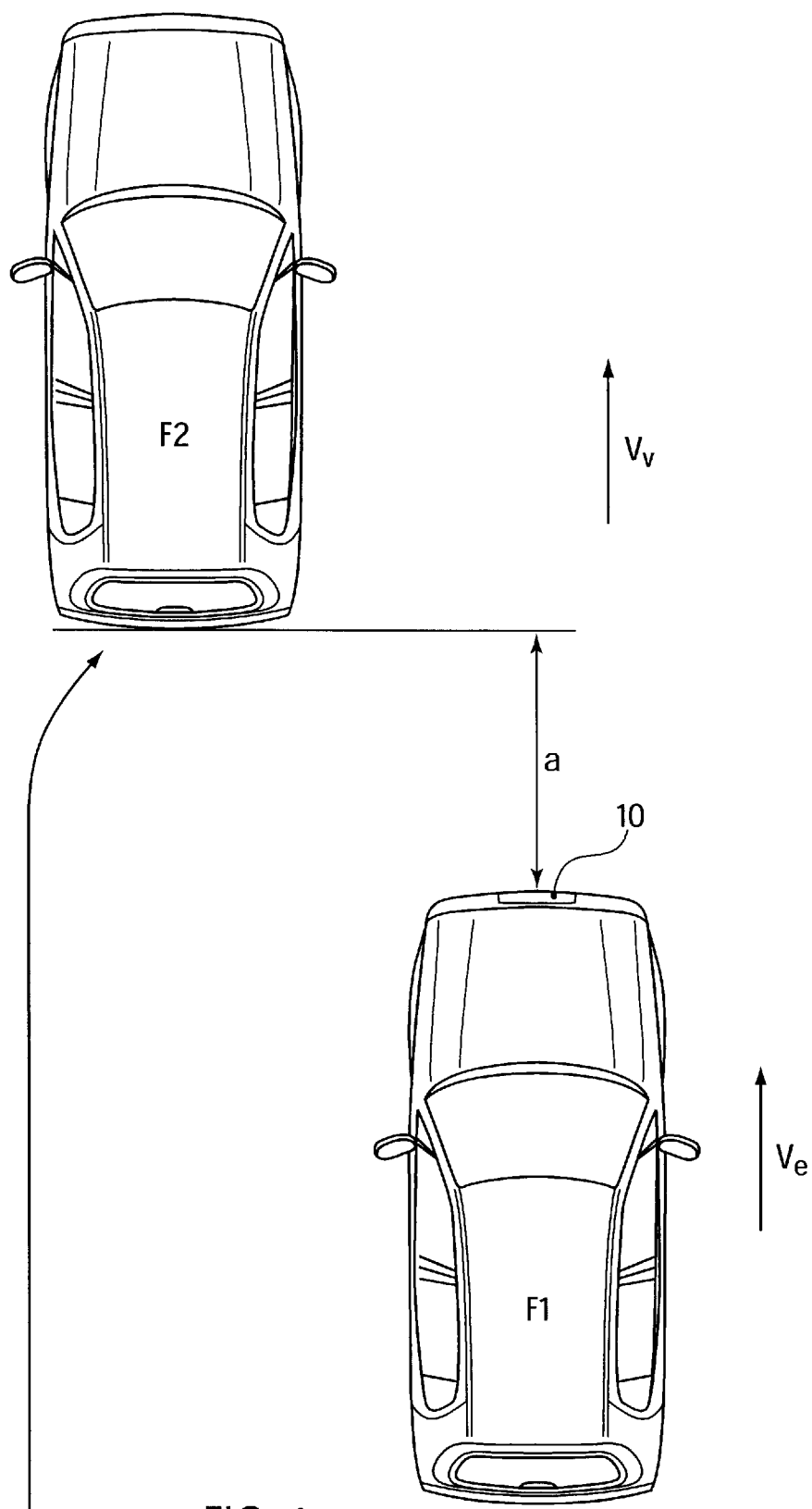
FIG. 1 is a schematic representation of a cut-in maneuver.

FIG. 1 illustrates a typical traffic situation during a cut-in maneuver, in which a vehicle F1 equipped with a device for carrying out the above-described method is passed by a faster second vehicle F2 which gets back into the lane in front of the passed vehicle F1 at a more or less large distance a. Vehicle F1 is moving with an individual velocity $v_e$, while vehicle F2 passing and driving in front of vehicle F1 after changing lanes is moving with a velocity $v_v$.

Vehicle F1 is equipped with sensor devices 10 that are known per se and are therefore not described in more detail and are only shown schematically in FIG. 1. The absolute velocity of vehicle F2, or at least the relative velocity $v_{rel}=v_v-v_e$ of vehicles F1 and F2 being detectable by the sensor devices 10. In addition, the distance a between vehicles F1 and F2 can be detected by sensor devices 10. Sensor devices 10 now generate a distance signal A characterizing distance a, and a velocity signal $v_v$ characterizing relative velocity $v_{rel}$ of vehicles F1 and F2 or, in the case of detecting absolute velocity $v_v$, a velocity signal characterizing this absolute velocity of vehicle F2. In the following description, it is assumed that the velocity signal represents relative velocity $v_{rel}$ of both vehicles F1 and F2. This does not restrict the universality of the following considerations, since for the case when the velocity signal represents absolute velocity $v_v$ of vehicle F2, it is obvious to one skilled in the art that he can easily determine relative velocity $v_{rel}$ from the known instantaneous velocity $v_e$ of vehicle F1.

Figure 2:
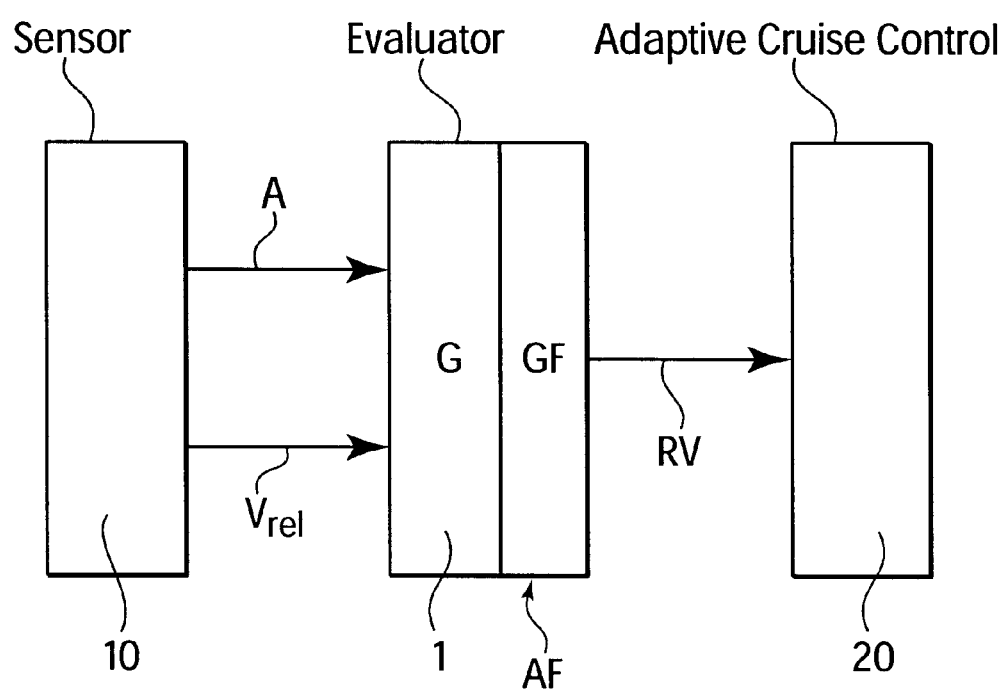
FIG. 2 is a schematic representation of the control loop of the method.

As schematically represented in FIG. 2, output signals A and V of sensor devices 10 are now fed to an evaluator 1, which, in the simplest case, is the on-board computer already present in the majority of today's vehicles. Evaluator 1 now determines a danger criterion G, which is defined as the product of relative velocity $v_{rel}$ and distance a ($G=v_{rel}* a$). This danger criterion G is now weighted in evaluator 1 with an adaptive factor AF characterizing the individual driving behavior of the vehicle driver, it being possible for this factor to be a constant quantity, to be predefined individually by the vehicle driver, or to be determined by an external system which recognizes the type of driver. When this adapted danger criterion GF=AF*G, obtained by weighting danger criterion G with driver-adaptive factor AF, is smaller than a predefined threshold value S, evaluator 1 generates a control signal RV which, in a manner already known and therefore not described in more detail, initiates a deceleration of the vehicle, in particular a braking operation, in that an adaptive cruise control device 20 initiates appropriate measures.

The above-described determination of a danger criterion G and GF, respectively, has the advantage that it permits a specific case differentiation for the operating dynamics and steps to be taken in response to an overtaking vehicle getting back into lane. If, for example, relative velocity $v_{rel}$ is positive, which will always be the case when passing vehicle F2 continues to drive faster than passed vehicle F1, and distance a is large, then (adaptive) danger criterion GF assumes a large value and, therefore, is above the predefined threshold value. This means that it is not necessary to decelerate vehicle F1.

If, however, given a positive relative velocity $v_{rel}$, distance a is small and adaptive danger criterion GF falls below threshold value S, then evaluator 1 generates deceleration signal RV initiating the deceleration of vehicle F1.

If an extremely high positive relative velocity $v_{rel}$ is detected and distance a is small, meaning that vehicle F2 passes vehicle F1 with a very high relative velocity $v_{rel}$ and gets back into lane directly in front of vehicle F1, thus cutting it off, then danger criterion GF still has a high value and is above the predefined threshold value, so that no deceleration is initiated.

However, if passing vehicle F2 decelerates abruptly after getting back into lane, then relative velocity $v_{rel}$ becomes negative. This means that the danger criterion assumes a negative value and, therefore, is less than predefined threshold value S, so that vehicle F1 is decelerated immediately.

In summary, it can be concluded that the described method for regulating distance of a vehicle F1 is especially advantageous when a vehicle F2 gets back into lane in front of vehicle F1, since the described method distinguishes itself by its ease of implementation and does not require long learning phases. Weighting danger criterion G with an adaptive factor AF characterizing the individual type of driver to produce an adaptive danger criterion GF, has the advantage that by this means, a control response of the described method that promotes acceptance by drivers is attained in a simple manner.

We claim:

1. A method for regulating clearance for a vehicle, in which a relative velocity ($v_{rel}$) and a relative distance (a) between a vehicle (F1) and a second vehicle driving ahead (F2) is detected, and a control signal (RV) for an adaptive cruise control device of the vehicle (F1) is generated from these quantities, comprising; determining a danger criterion (G) from the relative velocity ($v_{rel}$) and the relative distance (a); weighting the danger criterion (G) with an adaptive factor (AF) corresponding to the individual driving behavior of a driver of the vehicle (F1); and generating a control signal (RV) for initiating deceleration of the vehicle (F1) when the danger criterion (GF) weighted with the adaptive factor (AF) adjusted to the vehicle driver falls below a defined threshold value (S).

2. The method as recited in claim 1, wherein;
   the adaptive factor (AF) is a constant quantity.

3. The method as recited in claim 1, wherein;
   the adaptive factor (AF) is predefined by the vehicle driver.

4. The method as recited in claim 1, wherein;
   the adaptive factor (AF) is determined by an external system for recognizing individual driving patterns.

5. The method as recited in claim 2, 3 or 4, wherein;
   the relative velocity ($v_{rel}$) and the relative distance (a) are detected by a sensor device.

6. The method as recited in claim 2, 3 or 4, wherein;
   the relative velocity ($v_{rel}$) is determined from the absolute velocity (VA) of the preceding vehicle (F2) detected by the sensor device, and from the individual velocity ($V_e$) of the passed vehicle.

7. The method as recited in claim 5, wherein;
   the relative velocity ($v_{rel}$) is determined from the absolute velocity (VA) of the second vehicle (F2), and from the individual velocity ($V_e$) of the vehicle.

8. A device for regulating clearance for a vehicle, in which a relative velocity ($v_{rel}$) and a relative distance (a) between the vehicle (F1) and a second vehicle driving ahead (F2), comprising an evaluator supplied with a signal representing the relative velocity ($v_{rel}$) and the distance (a) and means for determining a danger criterion (G) from the relative velocity ($v_{rel}$) and the relative distance (a); weighting the danger criterion (G) with an adaptive factor (AF) corresponding to the individual driving behavior of a driver of the vehicle (F1); and generating a control signal (RV) for initiating deceleration of the vehicle (F1) when the danger criterion (GF) weighted with the adaptive factor (AF) adjusted to the vehicle driver falls below a defined threshold value (S).

9. The device as recited in claim 8, further comprising;
a sensor device for detecting distance (a) and relative velocity ($v_{rel}$) and an adaptive cruise control device.

10. A device for regulating clearance for a vehicle, comprising:
an evaluator supplied with a signal representing a relative velocity and a relative distance between the vehicle and a second vehicle driving ahead; and
an arrangement configured to determine a danger criterion from the relative velocity and the relative distance, to weight the danger criterion with an adaptive factor corresponding to an individual driving behavior of a driver of the vehicle and to generate a control signal for initiating deceleration of the vehicle when the danger criterion weighted with the adaptive factor adjusted to the vehicle driver falls below a defined threshold value.

11. The device according to claim 10, further comprising:
a sensor device configured to detect the relative distance and relative velocity; and
an adaptive cruise control device.

* * * * *

UNITED STATES PATENT AND TRADEMARK OFFICE
CERTIFICATE OF CORRECTION

PATENT NO. : 6,496,108 B1
DATED : December 17, 2002
INVENTOR(S) : Bäker et al.

It is certified that error appears in the above-identified patent and that said Letters Patent is hereby corrected as shown below:

<u>Title page,</u>
Item [73], change the Assignee's address from "Wolfburg" to -- Wolfsburg --

Signed and Sealed this

Sixteenth Day of December, 2003

JAMES E. ROGAN
*Director of the United States Patent and Trademark Office*